(12) United States Patent
Kakiuchi et al.

(10) Patent No.: US 8,360,168 B2
(45) Date of Patent: Jan. 29, 2013

(54) POWER TOOL

(75) Inventors: Yasuhiro Kakiuchi, Anjo (JP); Shinya Bito, Anjo (JP)

(73) Assignee: Makita Corporation, Anjo-Shi (JP)

( * ) Notice: Subject to any disclaimer, the term of this patent is extended or adjusted under 35 U.S.C. 154(b) by 39 days.

(21) Appl. No.: 12/847,289

(22) Filed: Jul. 30, 2010

(65) Prior Publication Data

US 2011/0030983 A1 Feb. 10, 2011

(30) Foreign Application Priority Data

Aug. 5, 2009 (JP) .................................. 2009-182409

(51) Int. Cl.
B25D 17/26 (2006.01)
(52) U.S. Cl. ........................................ 173/104; 173/201
(58) Field of Classification Search .................. 173/104, 173/162.1, 201, 212
See application file for complete search history.

(56) References Cited

U.S. PATENT DOCUMENTS

| | | | |
|---|---|---|---|
| 3,081,160 A * | 3/1963 | Ensign ............................ | 48/184 |
| 3,367,447 A | 2/1968 | Consoli et al. | |
| 4,379,492 A * | 4/1983 | Hiraoka .......................... | 173/181 |
| 4,403,679 A * | 9/1983 | Snider ............................ | 184/64 |
| 2006/0096768 A1* | 5/2006 | Ookubo ......................... | 173/48 |
| 2007/0125563 A1* | 6/2007 | Furusawa et al. .............. | 173/48 |

FOREIGN PATENT DOCUMENTS

| | | |
|---|---|---|
| EP | 1 464 449 A2 | 10/2004 |
| JP | A-2004-351595 | 12/2004 |
| JP | 2008036754 A * | 2/2008 |
| JP | A-2008-036754 | 2/2008 |

OTHER PUBLICATIONS

Jun. 27, 2012 Search Report issued in European Patent Application No. 10171870.8.

* cited by examiner

Primary Examiner — Sameh H. Tawfik
Assistant Examiner — Nathaniel Chukwurah
(74) Attorney, Agent, or Firm — Oliff & Berridge, PLC

(57) ABSTRACT

It is an object of the invention to provide a power tool that effectively prevents leakage of lubricant while regulating the internal pressure of a housing space for a driving mechanism. The object can be achieved by a representative power tool that includes a too bit 119, a driving mechanism 113, 115, an enclosed housing space 107a which houses the driving mechanism and in which lubricant is sealed in, and a path 151 which regulates pressure of the housing space 107a. On the path, a filter chamber 154 having a predetermined capacity, an inner passage 155c that communicates the filter chamber 154 with the housing space 107a, and an outer passage 159c that communicates the filter chamber 154 with the outside are formed. A filter 157 is disposed in the filter chamber 154 and spaced apart from a peripheral edge of an opening of the outer passage 159c which is open to the filter chamber 154, so that a space 161 is created on the opening edge side of the filter chamber 154. A throttle member 163, 167 is disposed in the space 161 and throttles flow of air which flows out to the outer passage 159c through the filter 157.

4 Claims, 4 Drawing Sheets

POWER TOOL

BACKGROUND OF THE INVENTION

1. Field of the Invention

The invention relates to a power tool and more particularly, to a power tool which can regulate internal pressure of a housing space for a driving mechanism.

2. Description of the Related Art

An electric hammer is known including a driving mechanism housed within a housing and driven by a motor to drive a tool bit for performing a striking movement in its axial direction and a rotation in its circumferential direction. Lubricant such as grease for lubricating the driving mechanism is provided within the housing space that houses the driving mechanism. The housing space is enclosed for preventing the charged lubricant from leaking to the outside. In such a construction, when the known hammer is operated, air within the housing is heated by an operation of the driving mechanism, such that the air within the housing expands to increase inside pressure. As a result, lubricant may possibly leak from the housing to the outside.

In this respect, Japanese laid-open Patent Publication No. 2008-36754 discloses an electric hammer which is capable of regulating the pressure of the housing space. According to this electric hammer, a pressure regulating path is formed by a filter chamber, an inner passage that communicates the filter chamber with the housing space of the housing, and an outer passage that communicates the filter chamber with the outside. Further, a filter is disposed in the filter chamber and spaced apart from a peripheral edge of an opening of the outer passage which is open to the filter chamber, so that lubricant within the housing space can be prevented from leaking to the outside.

While the above-described known art prevents leakage of lubricant from the housing space, further improvement is desired.

SUMMARY OF THE INVENTION

Accordingly, it is an object of the invention to provide a power tool that effectively prevents leakage of lubricant while regulating the internal pressure of a housing space for a driving mechanism.

Above described object can be achieved by the claimed invention. According to the invention, a representative power tool is provide which includes a driving mechanism for driving a tool bit, an enclosed housing space which houses the driving mechanism and in which lubricant for lubricating the driving mechanism is sealed in, and a path which communicates the housing space with the outside and regulates pressure of the housing space. The "power tool" according to this invention typically represents an impact power tool such as an electric hammer and a hammer drill, which performs a hammering operation or a drilling operation on a workpiece such as concrete by causing a tool bit to perform striking movement in its axial direction, rotation in its circumferential direction, or both. The power tool also widely includes various kinds of power tools, such as a cutting power tool for use in cutting operation, a grinding or polishing power tool for use in grinding or polishing operation, or a tightening power tool for use in screw-tightening operation. Further, grease is typically used as the "lubricant". The "outside" according to this invention includes both an internal space other than the housing space within the power tool and an external space (atmosphere) outside the power tool.

According to this invention, a filter chamber having a predetermined capacity, an inner passage that communicates the filter chamber with the housing space, and an outer passage that communicates the filter chamber with the outside are formed on the path. Further, a filter for absorbing lubricant which flows into the filter chamber is disposed in the filter chamber. As the "filter" according to this invention, typically, felt, sponge or cloth can be suitably used, but any other materials which can absorb and catch the lubricant can also be used.

Particularly according to the invention, the filter is spaced apart from a peripheral edge of an opening of the outer passage which is open to the filter chamber such that a space is provided on the side of this peripheral edge of the opening within the filter chamber. Further, a throttle member is disposed in the space and throttles flow of air which flows out to the outer passage through the filter.

With such a construction, when the internal pressure of the housing space abnormally increases during an operation of the power tool, air within the housing space flows out through the path, so that the internal pressure of the housing space is regulated. Specifically, pressure of the housing space is released. Therefore, if the power tool is an impact power tool such as an electric hammer or hammer drill, striking failure of the driving mechanism which may be caused by pressure increase within the housing space can be prevented.

According to the invention, when lubricant within the housing space flows out through the path together with air, the lubricant can be caught by the filter, so that the outflow of the lubricant to the outside can be prevented. On the other hand, depending on the velocity of flow of air which passes through the filter, some of the lubricant may possibly pass through the filter without being absorbed by the filter. Therefore, in this invention, in order to reduce the velocity of flow of air which flows through the filter, a space is formed on the outer passage side of the filter chamber, and a throttle member for throttling flow of air which flows out to the outer passage through the filter is disposed in the space. Specifically, in this invention, a member for reducing the outflow of the air is provided on the downstream side of the filter with respect to the air flow from the housing space to the outside. Thus, the lubricant absorbing effect of the filter can be enhanced, so that the outflow of the lubricant to the outer passage can be prevented. According to this invention, lubricant can be effectively prevented from leaking from the housing space to the outside while the internal pressure of the housing space is regulated.

As another aspect of the invention, the throttle member may preferably include a sheet member which is overlaid on top of the filter and throttles a passage between the filter and the space. Any material which is impervious to air can be used as the sheet member. In order to throttle the passage, a plurality of apertures such as small holes or slits can be provided in the sheet member.

Further, as another aspect of the invention, when the sheet member is used as the throttle member, the sheet member may be formed of circular elastic material, Further, a throttle passage may be defined by an outer circumferential surface of the elastic material and a peripheral wall surrounding the outer circumferential surface and communicates the filter with the space. Generally, air flows through the filter straight ahead toward the outer passage. According to this invention, however, by providing the throttle passage radially outside the elastic material, the elastic material serves as a blocking member for blocking flow of air which flows through the filter straight ahead toward the outer passage. Therefore, air which is prevented from flowing straight ahead by the elastic material flows radially outward from the central portion of the filter to the throttle passage. Thus, the distance of air flow through the filter can be elongated. As a result, a catch region (contact region) of the filter which catches or contacts the lubricant is enlarged, so that the filter can be effectively utilized in its entirety as a region of absorbing the lubricant.

Further, as another aspect of the invention, the throttle member may preferably include a second filter which is disposed in the space in such a manner as to be held in contact with the opening edge of the outer passage open to the filter chamber and spaced apart from the filter. As the "second filter" according to this invention, typically, felt, sponge or cloth may be suitably used, but any other material which can absorb and catch the lubricant can also be used. According to this invention, the second filter serves as a member for throttling flow of air which flows out to the outer passage. As a result, the velocity of flow of air which flows through the filter can be reduced, so that the lubricant absorbing effect of the filter can be enhanced. Further, the second filter itself can catch the lubricant which is flowing out to the outer passage. Therefore, lubricant can be effectively prevented from leaking to the outside.

Further, as another aspect of the invention, the power tool may further include a dynamic vibration reducer having a weight elastically held. The dynamic vibration reducer reduces vibration caused in the power tool during the operation by means of a reciprocating movement of the weight. The dynamic vibration reducer utilizes the pressure which fluctuates in the housing space as a force of driving the weight and the throttle enhances hermeticity of the housing space.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved power tools and method for using such power tools and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
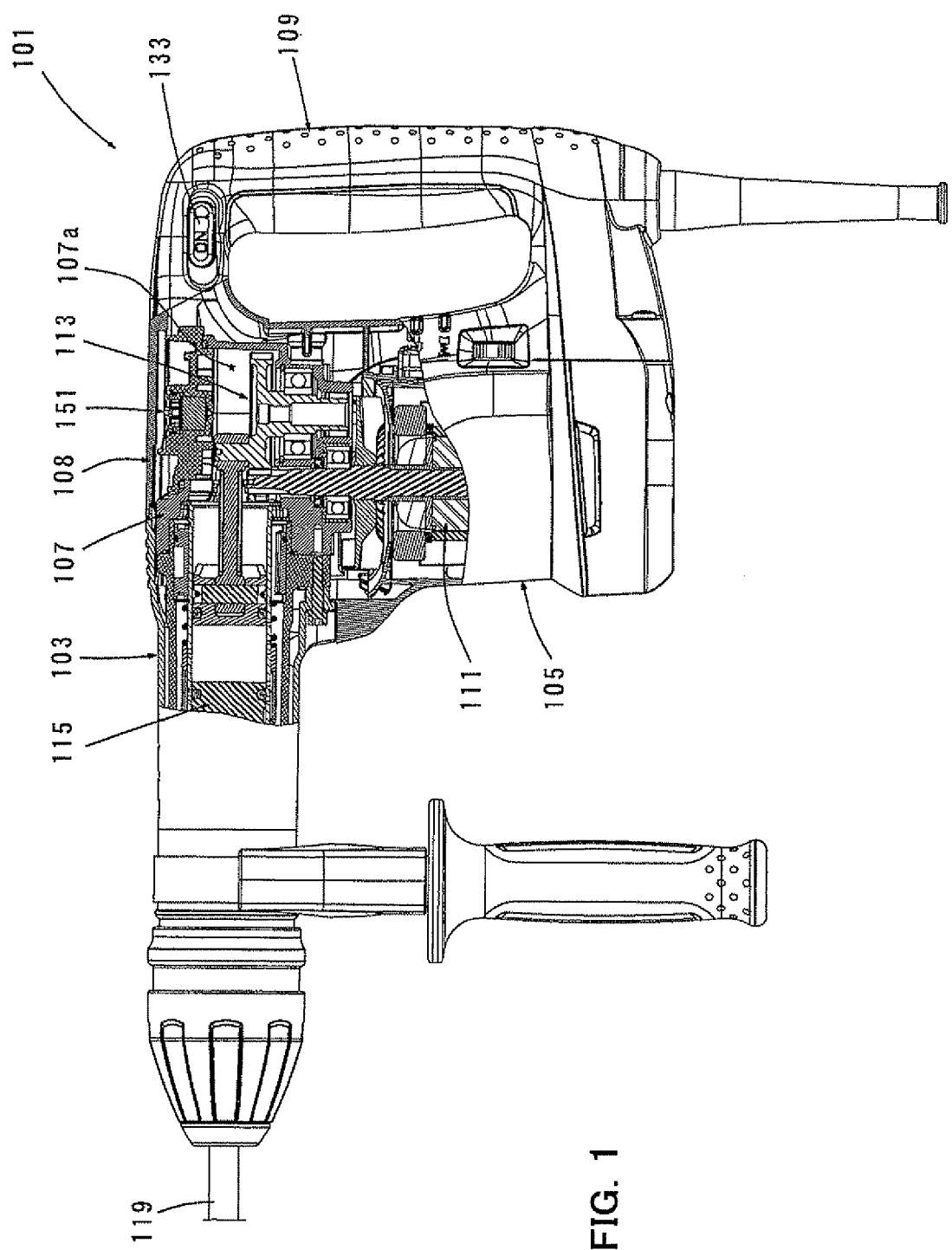
FIG. 1 is a view, partly in section, showing an entire electric hammer according to an embodiment of the invention.

An embodiment of the invention is now described with reference to FIGS. 1 to 4. In this embodiment, an electric hammer is explained as a representative example of a power tool according to the invention. As shown in FIG. 1, a representative hammer 101 includes a body 103 that forms an outer shell of the hammer 101, a hammer bit 119 detachably coupled to a tip end region (left end region as viewed in FIG. 1) of the body 103 via a tool holder (not shown), and a handgrip 109 that is connected to a rear end of the body 103 (on the side opposite from the hammer bit 119) and designed to be held by a user. The hammer bit 119 is coupled to the tool holder such that it can move in its axial direction with respect to the tool holder. The hammer bit 119 is a feature that corresponds to the "tool bit" according to the invention. For the sake of convenience of explanation, the side of the hammer bit 119 is taken as the front and the side of the handgrip 109 as the rear.

The body 103 mainly includes a motor housing 105 that houses a driving motor 111, and a gear housing 107 that houses a motion converting mechanism 113 and a striking mechanism 115. The driving motor 111 is disposed such that its axis of rotation runs vertically in a direction generally perpendicular to the longitudinal direction of the body 103 (the axial direction of the hammer bit 119).

Figure 2:
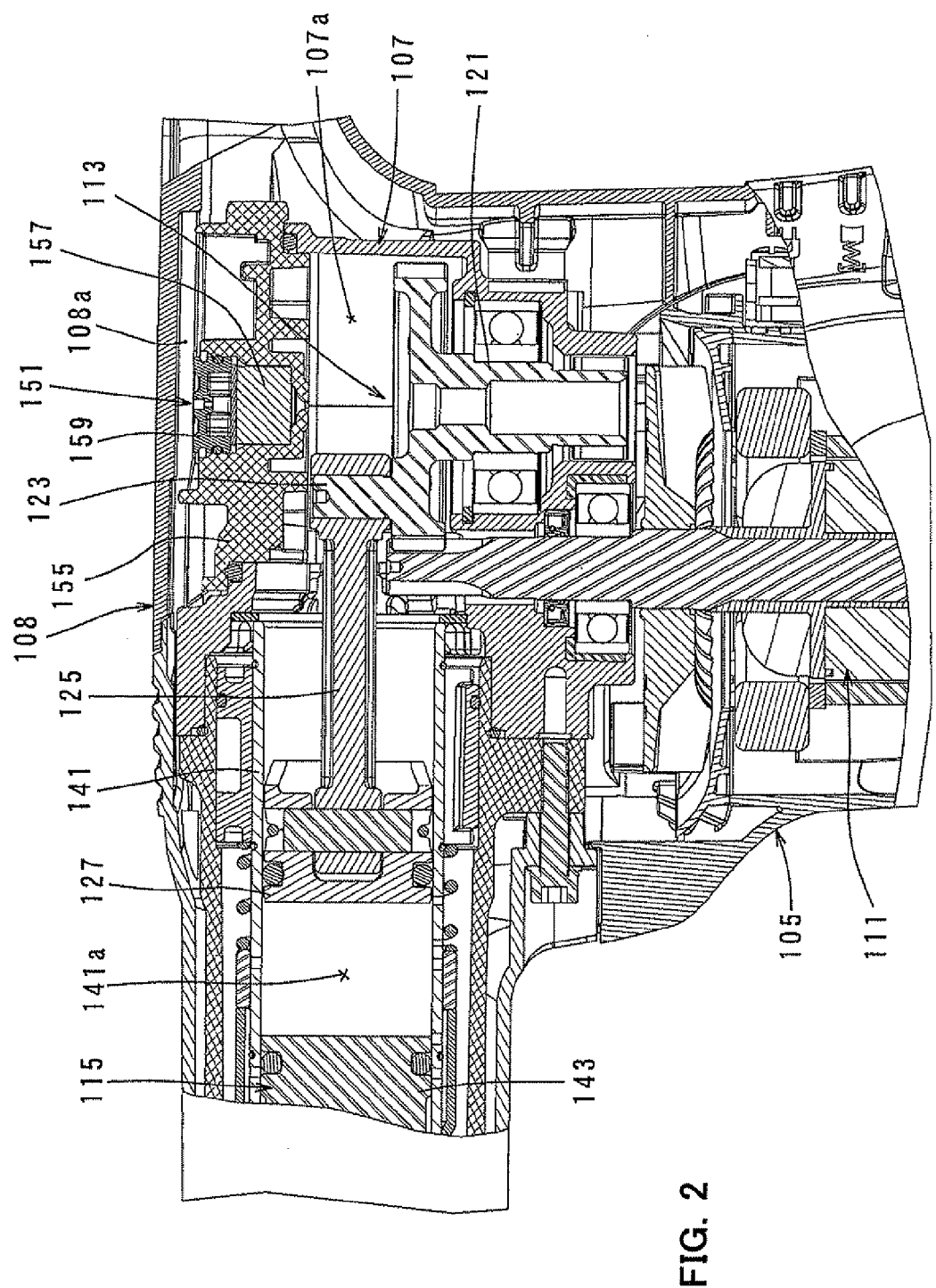
FIG. 2 is an enlarged sectional view showing part of FIG. 1.

As shown in FIG. 2, the motion converting mechanism 113 converts the rotating output of the driving motor 111 into linear motion and transmits it to the striking mechanism 115. Then an impact force is generated in the axial direction of the hammer bit 119 (the horizontal direction as viewed in FIG. 1) via the striking mechanism 115. The motion converting mechanism 113 and the striking mechanism 115 are features that correspond to the "driving mechanism" in this invention. Further, an internal space 107a of the gear housing 107 is formed as an enclosed space by sealing mating faces without creating a clearance therebetween. Lubricant (grease) for lubricating a sliding part of the motion converting mechanism 113 is sealed in the internal space 107a. The internal space 107a of the gear housing 107 is a feature that corresponds to the "housing space" according to the invention.

The motion converting mechanism 113 is formed by a crank mechanism including a crank shaft 121, a crank arm 125 and a driving element in the form of a piston 127. The crank shaft 121 is rotationally driven at a reduced speed via a plurality of gears by the driving motor 111. The crank arm 125 is connected to the crank shaft 125 via an eccentric pin 123 at a position displaced from the center of rotation of the crank shaft 125, and the piston 127 is reciprocated by the crank arm 125. The piston 127 is slidably disposed within a cylinder 141 and linearly moves along the cylinder 141 when the driving motor 111 is driven.

The striking mechanism 115 mainly includes a striking element in the form of a striker 143 which is slidably disposed in the bore of the cylinder 141, and an intermediate element in the form of an impact bolt (not shown) which is slidably disposed in the tool holder and transmits kinetic energy of the striker 143 to the hammer bit 119. The striker 143 is driven via an air spring action of an air chamber 141a of the cylinder 141 which is caused by sliding movement of the piston 127. Then the striker 143 collides with (strikes) the impact bolt which is slidably disposed in the tool holder, and a striking force is transmitted to the hammer bit 119 via the impact bolt.

As shown in FIG. 1, the handgrip 109 extends in the vertical direction transverse to the axial direction of the hammer bit 119 and has connecting portions protruding forward from its upper and lower extending ends. The upper and lower connecting portions are connected to the rear end of the body 103. Thus, the handgrip 109 connected to the body 103 at the upper and lower ends are generally D-shaped in side view. An operating member 133 which is slid by a user is disposed in an upper region of the handgrip 109, and when the operating member 133 is slid, a power switch (not shown) that energizes the driving motor 111 is switched between an on position and an off position.

In the hammer 101 having the above-described construction, when the user presses the hammer bit 119 against a workpiece by applying a forward pressing force to the body 103 and in this state, the driving motor 111 is energized, the piston 127 linearly slides along the cylinder 141 via the motion converting mechanism 113 which is mainly formed by the crank mechanism. When the piston 127 slides, the striker 143 moves forward within the cylinder 141 via the air spring action of the air chamber 141a of the cylinder 141 and collides with the impact bolt. The kinetic energy of the striker 143 which is caused by the collision is transmitted to the hammer bit 119. Thus, the hammer bit 119 performs a hammering operation on the workpiece (concrete).

During hammering operation by the hammer 101, the internal space 107a of the gear housing 107 may be heated by driving of the motion converting mechanism 113 and the striking mechanism 115 so that air within the enclosed internal space 107a expands and its pressure increases. In this case, the pressure of a space between the striker 143 and the impact bolt which communicates with the internal space 107a also increases. As a result, when the striker 143 is linearly moved via the air spring action of the air chamber 141a of the cylinder 141 which is caused by sliding movement of the piston 127, the air chamber 141a and the space between the striker 143 and the impact bolt may be thrown out of balance in pressure, so that the striker 143 may not properly perform linear movement or may cause striking failure. Further, if the pressure of the internal space 107a of the gear housing 107 increases, lubricant within the internal space 107a may leak out of the gear housing 107 from between the sealing faces. Therefore, in order to cope with this problem, a pressure regulating passage 151 is formed in the gear housing 107 and regulates (lowers) the internal pressure by releasing air out of the internal space 107a of the gear housing 107 when the internal pressure of the internal space 107a increases. The pressure regulating passage 151 is a feature that corresponds to the "path" according to this invention.

Figure 3:
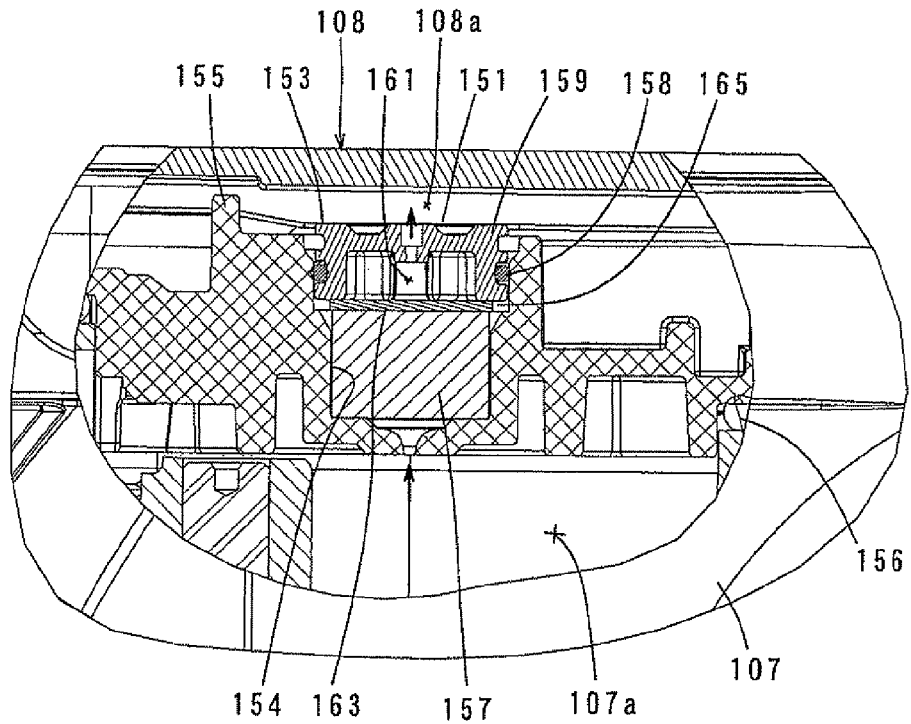
FIG. 3 is a further enlarged sectional view showing an essential part of this invention.
Figure 4:
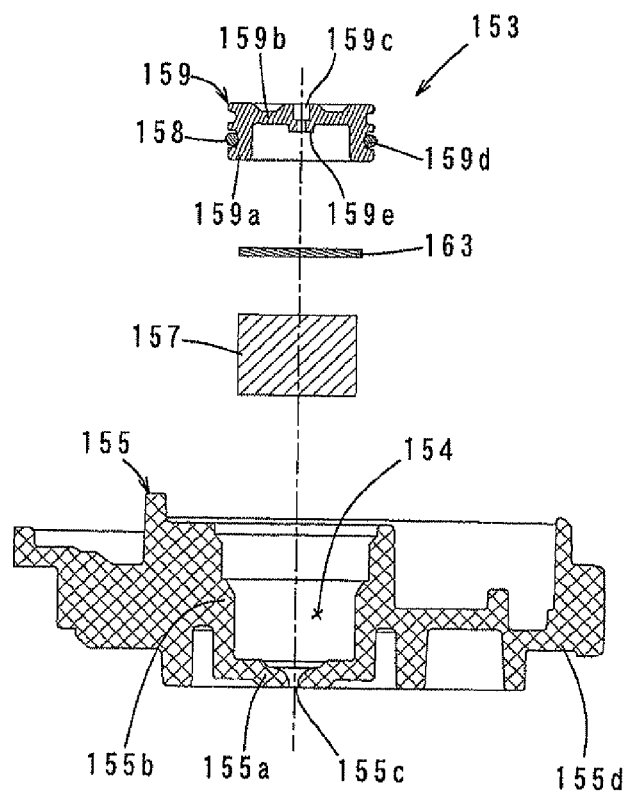
FIG. 4 is a sectional exploded view showing a cap member.

FIGS. 3 and 4 are enlarged views showing the construction of the pressure regulating passage 151 for regulating the internal pressure of the gear housing 107. The pressure regulating passage 151 is designed and provided such that the internal space 107a of the gear housing 107 communicates with the outside. An opening in the form of a filling opening through which lubricant is charged into the internal space 107a of the gear housing 107 is formed on the top side of the gear housing 107 or in an area of the gear housing 107 which is located on the top side when the user holds the handgrip 109 of the hammer 101 in such a manner that the axis of the hammer bit 119 extends generally horizontally. In this embodiment, a cap member 153 which is fitted in the filling opening is utilized to provide the pressure regulating passage 151.

The cap member 153 mainly includes a crank cap 155 for closing the filling opening, a lubricant absorbing filter 157 disposed in a filter housing space 154, and a filter cap 159 which is fitted in the crank cap 155. The filter housing space 154 is defined by the generally pot-shaped crank cap 155 having a circular section and an open top and the generally cylindrical filter cap 159 which has an open bottom and is fitted in the opening of the crank cap 155 from above. Specifically, the filter housing space 154 is a space having a circular section and surrounded by a bottom wall 155a and a peripheral wall 155b of the crank cap 155 and a peripheral wall 159a and a top wall 159b of the filter cap 159. The filter housing space 154 is a feature that corresponds to the "filter chamber" according to this invention.

The crank cap 155 further has an outer cylindrical portion 155d on the outside of the peripheral wall 155b. The outer cylindrical portion 155d is removably fitted in the filling opening from above, and in the fitted state, a clearance between the mating surfaces of the filling opening and the crank cap 155 is sealed by an O-ring 156. Further, a breathing hole 155c is formed generally in the center of a front end wall of the crank cap 155 in the fitting direction or the bottom wall 155a and extends through the bottom wall to provide communication between the filter housing space 154 and the internal space 107a of the gear housing 107. The breathing hole 155c of the crank cap 155 is a feature that corresponds to the "inner passage" according to this invention.

The filter cap 159 is mounted to the crank cap 155 by fitting it into the opening of the crank cap 155 from above. A breathing hole 159c is formed substantially in the center of a rear end wall of the filter cap 159 in the fitting direction or the top wall 159b and extends through the top wall 159b in order to provide communication between the filter housing space 154 and the outside of the gear housing 107. The breathing hole 159c of the filter cap 159 is a feature that corresponds to the "outer passage" according to this invention. An annular groove 159d is formed in the outside surface of the peripheral wall 159a of the filter cap 159 in the circumferential direction, and an O-ring 158 is disposed in the annular groove 159d. When the filter cap 159 is fitted in the crank cap 155, the O-ring 158 seals a clearance between the mating surfaces of the filter cap 159 and the crank cap 155 by elastic deformation, and at the same time, it holds the filter cap 159 in the fitted state (position) by its frictional contact with the inside surface of the peripheral wall 155b of the crank cap 155.

The replaceable filter 157 in the filter housing space 154 is formed of felt and absorbs and catches lubricant which flows into the filter housing space 154 through the breathing hole 155c. The filter 157 has almost the same diameter as the filter housing space 154. The filter 157 is inserted into the opening of the crank cap 155 from above until it comes in contact with the bottom wall 155a, and, in this state, it is housed in a lower region of the filter housing space 154. As a result, a free space in the form of an upper space 161 is created in an upper region of the filter housing space 154 or between the upper surface of the filter 157 and the inner surface (lower surface) of the top wall 159b of the filter cap 159. The upper space 161 is a feature that corresponds to the "space" according to this invention.

A flexible circular rubber sheet 163 is overlaid on top of the filter 157 in the upper space 161. The peripheral wall 155b of the crank cap 155 has a larger inside diameter in a region in which the rubber sheet 163 is disposed and in a region in which the filter cap 159 is fitted than in the region in which the filter 157 is housed. The diameter of the rubber sheet 163 is smaller than the inside diameter of the peripheral wall 155b which surrounds the rubber sheet 163. Thus, an annular throttle passage 165 is formed between the inner circumferential surface of the peripheral wall 155b of the crank cap 155 and the outer circumferential surface of the rubber sheet 163 and communicates the filter 157 with the upper space 161. Specifically, the rubber sheet 163 is provided as a member for narrowing the sectional area of the passage of air which flows from the filter 157 to the upper space 161. The throttle passage 165 is a feature that corresponds to the "throttle passage" according to this invention. The rubber sheet 163 is a feature that corresponds to the "throttle member", "sheet member" and "elastic member" according to this invention.

When the filter cap 159 is fitted in the opening of the crank cap 155 from above, the lower end surface of the peripheral wall 159a of the filter cap 159 presses a radially outer portion of the upper surface of the rubber sheet 163 disposed on top of the filter 157. Thus, the filter 157 and the rubber sheet 163 are held from below and above between the bottom wall 155a of the crank cap 155 and the lower end surface of the peripheral wall 159a of the filter cap 159, so that their unnecessary movement is prevented. Further, a passage for leading air from the filter 157 to the upper space 161 through the throttle passage 165 is formed in the lower end surface of the peripheral wall 159a of the filter cap 159 which presses the radially outer portion of the upper surface of the rubber sheet 163, or in the upper surface of the rubber sheet 163, as necessary.

Further, a tapered extension 159e having a circular section is formed on a peripheral edge of an opening of the breathing hole 159c on the inner surface of the upper wall 159b of the filter cap 159 and protrudes a predetermined extent into the filter housing space 154. The extension 159e forms a region for changing the direction of flow of the lubricant.

As described above, in this embodiment, the pressure regulating passage 151 is formed in the gear housing 107 such that the internal space 107a of the gear housing 107 communicates with the outside or with a space 108a between the gear housing 107 and an outer cover 108 covering the gear housing 107 (see FIGS. 2 and 3). The space 108 is a feature that corresponds to the "outside" according to this invention. Therefore, during hammering operation by the hammer 101, when the internal space 107a is heated by driving of the motion converting mechanism 113 and the striking mechanism 115, so that air within the enclosed internal space 107a expands and its pressure increases, air within the internal space 107a flows out to the space 108a outside the gear housing 107 via the pressure regulating passage 151. Specifically, pressure of the internal space 107a of the gear housing 107 is released. As a result, the internal pressure of the gear housing 107 is regulated so as to be prevented from increasing. Thus, striking failure which may be caused by pressure rise within the gear housing 107 can be prevented. In FIG. 3, air flow for pressure regulation is shown by arrow.

The pressure regulating passage 151 in this embodiment has the filter housing space 154, the inner breathing hole 155c that communicates the filter housing space 154 with the internal space 107a of the gear housing 107, and the outer breathing hole 159c that communicates the filter housing space 154 with the space 108a outside the gear housing 107. Further, the filter 157 for absorbing lubricant which flows into the filter housing space 154 is housed in the filter housing space 154. With this construction, when lubricant flows from the internal space 107a of the gear housing 107 into the filter housing space 154 through the inner breathing hole 155c by the above-described pressure releasing action, the filter 157 absorbs and catches the lubricant, so that the lubricant can be prevented from leaking out to the space 108a.

According to this embodiment, the rubber sheet 163 is overlaid on top of the filter 157, and the annular throttle passage 165 is formed between the inner circumferential surface of the peripheral wall 155b and the outer circumferential surface of the rubber sheet 163. With this construction, flow of air which flows out to the upper space 161 through the filter 157 is throttled. Therefore, the velocity of flow of air which passes through the filter 157 on the upstream side of the throttle passage 165 decreases. As a result, the filter 157 can easily absorb the lubricant, so that the lubricant can be prevented from flowing out to the space 108a.

Further, the rubber sheet 163 also serves as a straight-flow blocking member for blocking flow of air which flows into the filter 157 through the inner breathing hole 155c and then straight ahead toward the outer breathing hole 159a. Therefore, air which is led into a central portion of the filter 157 through the inner breathing hole 155c flows radially outward from the central portion and then into the throttle passage 165 located radially outside the rubber sheet 163. Thus, compared with a construction without the rubber sheet 163, the flowing distance of air through the filter 157 can be elongated. As a result, a catch region (contact region) of the filter 157 which catches or contacts the lubricant is enlarged, so that the lubricant absorbing performance of the filter 157 can be enhanced.

Thus, according to this embodiment, leakage of lubricant from the internal space 107a to the space 108a can be effectively prevented while the internal pressure of the internal space 107a is regulated.

In the hammer 101, a dynamic vibration reducer of a forced vibration type may be provided in the body 103 as a means for reducing vibration caused in the body 103 during hammering operation. The dynamic vibration reducer utilizes the pressure which fluctuates in the gear housing 107 by driving of the motion converting mechanism 113 (reciprocating movement of the piston 127), as a force of vibrating the weight. The dynamic vibration reducer of a forced vibration type is known in the art, and therefore its detailed description is omitted. In the pressure regulating passage 151 according to this embodiment, as described above, by provision of the throttle on the downstream side of the filter 157, compared with a construction having no such throttle, hermeticity of the internal space 107a is enhanced so that the internal pressure is not reduced more than necessary. Therefore, the pressure of the internal space 107a can be effectively utilized as a weight vibrating force of the dynamic vibration reducer.

In this embodiment, the peripheral wall 155b of the crank cap 155 has a larger inside diameter in a region in which the rubber sheet 163 is disposed than in the region in which the filter 157 is disposed. Further, the diameter of the rubber sheet 163 is smaller than the inside diameter of the peripheral wall 155b. With this construction, the annular throttle passage 165 is formed between the peripheral wall 155b and the rubber sheet 163. Alternatively, the region in which the rubber sheet 163 is disposed may have the same inside diameter as the region in which the filter 157 is disposed, and the rubber sheet 163 may have a smaller diameter than the filter 157, so that the annular throttle passage 165 is formed between the peripheral wall 155b and the rubber sheet 163.

Further, in place of the annular throttle passage 165, for example, a plurality of apertures such as small holes or slits may be formed in the rubber sheet 163 in order to form the throttle passage. Further, the rubber sheet 163 may be changed to a resin sheet or a metal sheet.

Next, a second embodiment of the invention is described with reference to FIG. 5. In this embodiment, in the throttle member of the pressure regulating passage 151, a second filter 167 is used in place of the rubber sheet 163 of the above-described first embodiment. In the other points, the second embodiment has the same construction as the first embodiment. Therefore, components in this embodiment which are substantially identical to those in the first embodiment are given like numerals as in the first embodiment, and they are not described or only briefly described.

Figure 5:
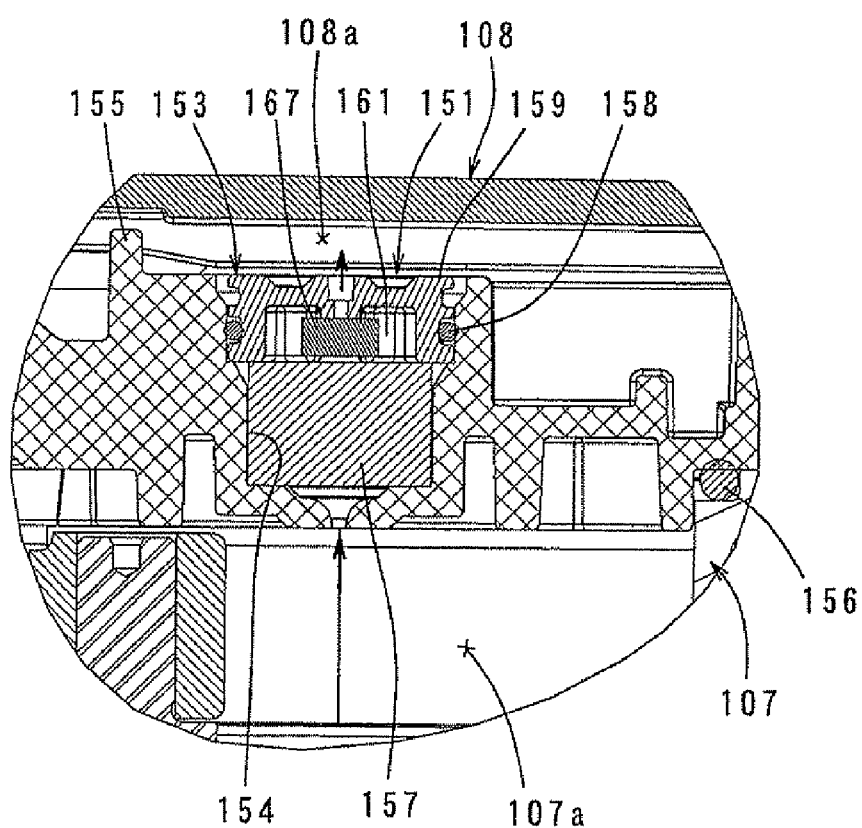
FIG. 5 is a sectional view showing another embodiment of the invention.

As shown in FIG. 5, the second filter 167 is disposed within the upper space 161 above the filter 157. The second filter 167 is formed of felt, and it is spaced apart from the filter 157 and mounted (fixed) so as to cover the opening edge of the outer breathing hole 159c. Further, the radially outer portion of the upper surface of the filter 157 is pressed by the lower end surface of the peripheral wall 159a of the filter cap 159.

According to this embodiment constructed as described above, when air within the internal space 107a of the gear housing 107 expands and its pressure increases, air within the internal space 107a flows out through the inner breathing hole 155c, passes through the filter 157 and is then led to the upper space 161. Thereafter, the air passes through the second filter 167 and flows out to the space 108a through the outer breathing hole 159c. In this manner, the pressure within the internal space 107a can be regulated, so that striking failure can be prevented. In FIG. 5, air flow for pressure regulation is shown by arrow.

When air within the internal space 107a flows out into the space 108a, lubricant within the internal space 107a may flow into the filter housing space 154 through the inner breathing hole 155c together with air. At this time, the filter 157 absorbs and catches the lubricant, so that the lubricant can be prevented from leaking to the space 108a.

In this embodiment, the second filter 167 is arranged to cover the opening of the outer breathing hole 159c, so that the flow of air which flows out to the space 108a through the breathing hole 159c can be throttled. As a result, the velocity of flow of air which flows through the filter 157 decreases. Therefore, like in the above-described embodiment, the filter 157 can easily absorb the lubricant, so that the lubricant can be prevented from flowing out to the space 108a.

Further, the second filter 167 according to this embodiment not only serves as a member for throttling the flow of air which flows out through the breathing hole 159c, but catches lubricant which may flow out to the space 108a through the breathing hole 159e. With such a construction, the effect of preventing leakage of lubricant can be further enhanced. Further, with the arrangement in which the second filter 167 is spaced apart from the filter 157, the flow of lubricant which has passed through the filter 157 is once interrupted, which is also effective in preventing leakage of lubricant.

In the above-described embodiments, a hammer is described as being of the type which utilizes a crank mechanism as the motion converting mechanism 113 for converting the rotating output of the driving motor 111 into linear motion and driving the striker 143. However, the invention may also be applied to a hammer of the type which linearly drives the piston 127 by a swinging mechanism that converts rotation of the driving motor 111 into swinging motion in the axial direction of the hammer bit 119. Further, in the above-described embodiments, the electric hammer 101 is described as a representative example of a power tool, but the invention can be applied not only to the hammer 101 but to any kind of power tools in which lubricant for lubricating a driving mechanism is sealed in a housing that houses the driving mechanism.

DESCRIPTION OF NUMERALS 101 hammer (power tool)
103 body
105 motor housing
107 gear housing
107a internal space (housing space)
108 outer cover
108a space (outside)
109 handgrip
111 driving motor
113 motion converting mechanism (driving mechanism)
115 striking mechanism (driving mechanism)
119 hammer bit (tool bit)
121 crank shaft
123 eccentric pin
125 crank arm
127 piston
133 operating member
141 cylinder
141a air chamber
143 striker
151 pressure regulating passage (path)
153 cap member
154 filter housing space (filter chamber)
155 crank cap
155a bottom wall
155b peripheral wall
155c breathing hole (inner passage)
155d outer cylindrical portion
156 O-ring
157 filter
158 O-ring
159 filter cap
159a peripheral wall
159b upper wall
159c breathing hole (outer passage)
159d annular groove
159e extension
161 upper space (space)
163 rubber sheet (throttle member) (sheet member) (elastic member)
165 throttle passage
167 second filter (throttle member)

What we claim is:

1. A power tool comprising:
a driving mechanism to drive a tool bit,
an enclosed housing space which houses the driving mechanism and in which lubricant to lubricate the driving mechanism is sealed in,
a path which communicates the housing space with the outside to regulate pressure of the housing space,
a filter chamber having a predetermined capacity provided on the path,
an inner passage provided on the path to communicate the filter chamber with the housing space,
an outer passage provided on the path to communicate the filter chamber with the outside are formed on the path,
a filter disposed in the filter chamber to absorb lubricant, the filter spaced apart from a peripheral edge of an opening of the outer passage which is open to the filter chamber, so that a space is formed on the opening edge side of the filter chamber, and
a throttle disposed in the space to throttle flow of air which flows out to the outer passage through the filter,
wherein the throttle member includes a sheet member which is overlaid on top of the filter and throttles a passage between the filter and the space, the sheet member being formed of circular elastic material.

2. The power tool according claim 1, wherein a throttle passage is defined by an outer circumferential surface of the sheet member and a peripheral wall surrounding the outer circumferential surface and communicates the filter with the space.

3. The power tool according to claim 1, wherein the throttle member comprises a second filter which is disposed in the space in such a manner as to be held in contact with the opening edge and spaced apart from the filter.

4. The power tool according to claim 1, further comprising a dynamic vibration reducer having a weight elastically held, the dynamic vibration reducer reducing vibration caused in the power tool during the operation by means of a reciprocating movement of the weight, wherein the dynamic vibration reducer utilizes the pressure which fluctuates in the housing space as a force of driving the weight and the throttle enhances hermeticity of the housing space.

* * * * *